US006967284B1

(12) United States Patent
Gretz

(10) Patent No.: US 6,967,284 B1
(45) **Date of Patent: *Nov. 22, 2005**

(54) ELECTRICAL BOX MOUNTING ASSEMBLY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 25 days.

This patent is subject to a terminal disclaimer.

(21) Appl. No.: 10/945,407

(22) Filed: Sep. 20, 2004

(51) Int. Cl.[7] .......................... H01H 9/02; H01H 13/04
(52) U.S. Cl. ............................ 174/58; 174/50; 174/57; 174/63; 248/906; 200/297
(58) Field of Search .............................. 174/48, 50, 53, 174/57, 58, 61, 62, 63, 54; 248/906, 343, 248/201.1, 57, 544, 27.1, 300, 342; 200/297, 200/296, 51 R; 220/3.2, 3.8, 3.9

(56) References Cited

U.S. PATENT DOCUMENTS 3,518,421 A * 6/1970 Cogdill ........................ 248/57
4,967,990 A * 11/1990 Rinderer ..................... 248/906
5,209,444 A * 5/1993 Rinderer ..................... 248/906
5,303,894 A * 4/1994 Deschamps et al. ........ 248/343
5,386,959 A * 2/1995 Laughlin et al. ............ 248/906
5,405,111 A * 4/1995 Medlin, Jr. ................. 248/906
5,934,631 A 8/1999 Becker et al.
5,938,157 A 8/1999 Reiker
5,954,304 A 9/1999 Jorgensen
6,098,945 A 8/2000 Korcz
6,332,597 B1 12/2001 Korcz et al.
6,484,980 B2* 11/2002 Medlin et al. .............. 248/906
6,768,071 B1* 7/2004 Gretz .......................... 174/50

* cited by examiner

*Primary Examiner*—Dean A. Reichard
*Assistant Examiner*—Angel R. Estrada

(57) ABSTRACT

An adjustable mounting bar and electrical box assembly for hanging a light fixture, fan, or other electrical device from a ceiling. All hardware required for mounting the electrical device is included with the assembly. The adjustable mounting bar includes sliding tubular members with end flanges for spanning between adjacent overhead joists. An electrical box is connected to the tubular members by a clamp and outer clamping fasteners, which can be loosened to adjust the length of the adjustable mounting bar. The end flanges include penetrable tabs that can be driven into the overhead joists to temporarily secure the adjustable mounting bar to the joists and thereby free the installer's hands. The outer face of the end flanges include a series of rows of slots arranged horizontally thereon and forming a plurality of bend lines. To accommodate ceiling coverings of various thickness, the end flanges can be bent outwards at the proper bend line to position the lower end of the electrical box flush with the ceiling surface. Load bearing bar fasteners threadably engaged in temporary storage receptacles in the sliding tubular members are removed therefrom and fastened through the end flanges to securely fasten the mounting bar to the joists. Load bearing device fasteners threadably engaged in temporary storage receptacles in the electrical box are removed therefrom and driven into receptacles in the clamp to secure the electrical device to the mounting bar. Oversize openings are provided in the top wall of the electrical box to ensure that the entire suspended load is borne by the clamp and mounting bar and not the electrical box.

6 Claims, 8 Drawing Sheets

ELECTRICAL BOX MOUNTING ASSEMBLY

FIELD OF THE INVENTION

This invention relates to electrical junction boxes and specifically to an electrical box mounting assembly for mounting a fan or light fixture to a ceiling.

BACKGROUND OF THE INVENTION

Electrical boxes are commonly mounted on ceilings for the purpose of supporting ceiling fans, light fixtures, or other electrical devices. The electrical box provides a safe enclosure to house all wiring connections. Typically, these electrical boxes are secured to the ceiling by a supporting device that spans between two adjacent ceiling joists.

Various considerations are necessary in providing supporting devices for ceiling-mounted electrical boxes. The National Electrical Code specifies a maximum weight of 80 pounds for ceiling light fixtures and a maximum weight of 70 pounds for ceiling fans. It is therefore very important that an installer use adequate load-bearing fasteners for securing the supporting device to the overhead joists. It is also important that the load be carried by the supporting device, and not by the electrical box.

A second consideration arises from the awkwardness of working overhead. Typically, when securing a supporting device and an electrical box to the overhead structure of the ceiling, several separate items must be manipulated. These include the mounting bar, the electrical box, the fasteners for securing the mounting bar to the ceiling structure, and the fasteners for mounting the electrical box to the mounting bar. Considering that the installer is typically on a ladder, this creates a challenging task for any installer. It is therefore imperative that all parts necessary for a successful installation are on hand for the installer.

A third consideration is that the support device must be matched to an electrical box. Many supporting devices are meant to accommodate most commercial electrical boxes. This typically requires complex arrangements on the supporting device to accommodate a variety of boxes.

A further consideration arises as a result of the various different types of ceilings, each of a different thickness. It should be easy for an installer to mount the support device correctly on the overhead joists to position the bottom of the electrical box flush with the ceiling, regardless of the thickness of the ceiling.

Many supporting devices for ceiling fans and fixtures include an arrangement to temporarily secure the device to the ceiling joists including U.S. Pat. No. 5,934,631 to Becker, et al., U.S. Pat. No. 5,954,304 to Jorgensen, U.S. Pat. No. 5,938,157 to Reiker, and U.S. Pat. No. 6,098,945 to Korcz, and U.S. Pat. No. 6,332,597 to Korcz et al.

Although all of the above supporting devices include an arrangement for temporarily fastening the supporting device to overhead joists to free up an installer's hands, they are still not completely satisfactory for simplifying the remainder of the task for installing the electrical box and the light fixture or fan to the supporting device.

SUMMARY OF THE INVENTION

The invention is an adjustable mounting bar and electrical box assembly for hanging a light fixture, fan, or other electrical device from a ceiling. All hardware required for mounting the electrical device is included with the assembly. The adjustable mounting bar includes sliding tubular members with end flanges for spanning between adjacent overhead joists. An electrical box is connected to the tubular members by a clamp and outer clamping fasteners, which can be loosened to adjust the length of the adjustable mounting bar. The end flanges include penetrable tabs that can be driven into the overhead joists to temporarily secure the adjustable mounting bar to the joists and thereby free the installer's hands. The outer face of the end flanges include a series of rows of slots arranged horizontally thereon and forming a plurality of bend lines. To accommodate ceiling coverings of various thickness, the end flanges can be bent outwards at the proper bend line to position the lower end of the electrical box flush with the ceiling surface. Load bearing bar fasteners threadably engaged in temporary storage receptacles in the sliding tubular members are removed therefrom and fastened through the end flanges to securely fasten the mounting bar to the joists. Load bearing device fasteners threadably engaged in temporary storage receptacles in the electrical box are removed therefrom and driven into receptacles in the clamp to secure the electrical device to the mounting bar. Oversize openings are provided in the top wall of the electrical box to ensure that the entire suspended load is borne by the clamp and mounting bar and not the electrical box.

OBJECTS AND ADVANTAGES

The electrical box mounting assembly of the present invention provides a complete mounting assembly for mounting an electrical device to a ceiling, including all of the required fastening hardware. All of the installation hardware that is required to complete the task is provided as a part of the mounting assembly, including all required fasteners.

An additional advantage is that the required fasteners are held securely in the electrical box mounting assembly in temporary storage receptacles. The temporary storage receptacles provide an advantage in that the fasteners are held securely in the assembly until they are ready to be used. The required fastening hardware is therefore on hand for installation at the time it is required. By freeing up an installer's hands, the task of mounting an electrical device to a ceiling is therefore greatly simplified and the installation time greatly reduced. Additionally, by having all of the required fastening hardware on hand, the installer is not burdened by the task of locating appropriate fasteners at the appropriate time.

The electrical box mounting assembly also provides the advantage that the entire load is supported by the supporting bars and the clamp, and not by the electrical box itself.

A further advantage is that the fastening hardware, while in storage in the temporary storage receptacles, does not extend beyond the outer periphery of the bars and end flanges.

These and other objects and advantages of the present invention will be better understood by reading the following description along with reference to the drawings.

TABLE OF NOMENCLATURE

Figure 1:
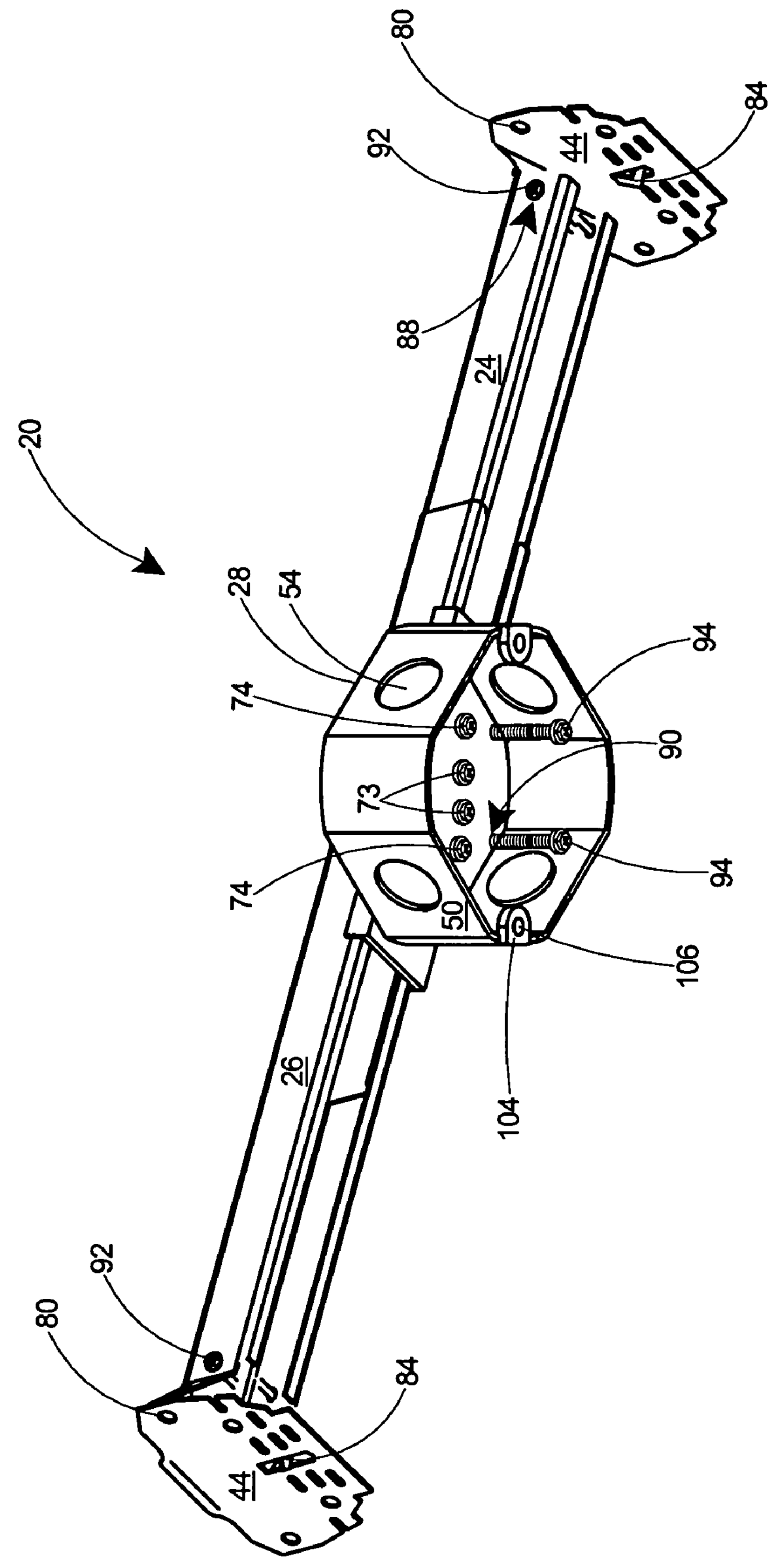
FIG. 1 is a perspective view of a preferred embodiment of an electrical box mounting assembly according to the present invention including an adjustable mounting bar and an electrical box assembly.

The following is a listing of part numbers used in the drawings along with a brief description:

| Part Number | Description |
|---|---|
| 20 | electrical box mounting assembly |
| 22 | adjustable mounting bar |
| 24 | inner tubular member |
| 26 | outer tubular member |
| 28 | electrical box |
| 30 | outer end of inner tubular member |
| 32 | inner end of inner tubular member |
| 34 | outer end of outer tubular member |
| 36 | inner end of outer tubular member |
| 38 | bottom sides of tubular members |
| 40 | longitudinal slot |
| 42 | lip |
| 44 | end flange |
| 46 | top wall of electrical box |
| 48 | top surface of top wall |
| 50 | side walls of electrical box |
| 52 | bottom edge of side walls of electrical box |
| 54 | knockout areas |
| 56 | clamp arrangement |
| 58 | inner bar |
| 60 | outer clamping member |
| 62 | outer aperture in inner bar |
| 64 | inner aperture in inner bar |
| 66 | middle aperture in outer clamping member |
| 68 | inner threaded bore in outer clamping member |
| 70 | planar portion of outer clamping member |
| 72 | upturned edge |
| 73 | first fastener |
| 74 | outer clamping fastener |
| 76 | oversized opening in top wall of electrical box |
| 78 | receptacle |
| 80 | aperture in flange |
| 82 | inner face of flange |
| 83 | outer face of flange |
| 84 | V-shaped tab |
| 86 | joist |
| 88 | first temporary storage receptacle |
| 90 | second temporary storage receptacle |
| 92 | bar fastener |
| 94 | device fastener |
| 98 | outer edge of flange |
| 100 | mounting ring |
| 102 | electrical device |
| 104 | bent over portion of bottom edge of electrical box |
| 106 | alignment apertures |
| 108 | side portion of rectangular cross section |
| 110 | top surface of lip |
| 111 | inner channel within tubular members |
| 112 | aperture in top wall of electrical box for first fastener |
| 114 | aperture in top wall of electrical box for device fastener |
| 116 | grounding aperture |
| 118 | grounding screw |
| 120 | outer surface of end flange |
| 122 | row of apertures or slots |
| 124A | first bend line |
| 124B | second bend line |
| 124C | third bend line |
| 126 | indicia |
| 128 | outward facing seat |
| 130 | ceiling cover |
| 132 | bottom edge of end flange |
| 134 | line connecting bottom edge of end flanges |
| 136 | line level with ceiling surface |
| 140 | positioning arrangement |

DETAILED DESCRIPTION OF THE INVENTION

Referring to FIG. 1, there is depicted an electrical box mounting assembly 20 for securing an electrical device (not shown), such as a light fixture or a fan, to a ceiling. The electrical box mounting assembly 20 includes an adjustable mounting bar 22 including an inner 24 and an outer 26 tubular member, and an electrical box 28.

Referring to FIGS. 2–5, the inner tubular member 24 has an outer end 30 and an inner end 32. The outer tubular member 26 also has an outer end 34 and an inner end 36. Both of the tubular members 24, 26 have rectangular cross sections.

Figure 5:
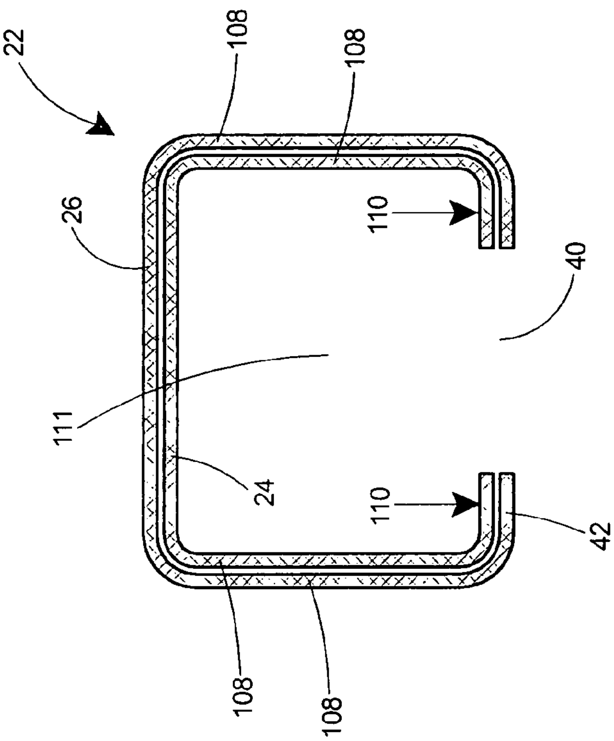
FIG. 5 is a cross-sectional view of the adjustable mounting bar taken along line 5—5 of FIG. 4.

As shown in FIG. 5, the inner tubular member 24 has a smaller rectangular cross section than the outer tubular member 26, thereby enabling the inner tubular member 24 to be received in and slide with respect to the outer tubular member 26.

Figure 2:
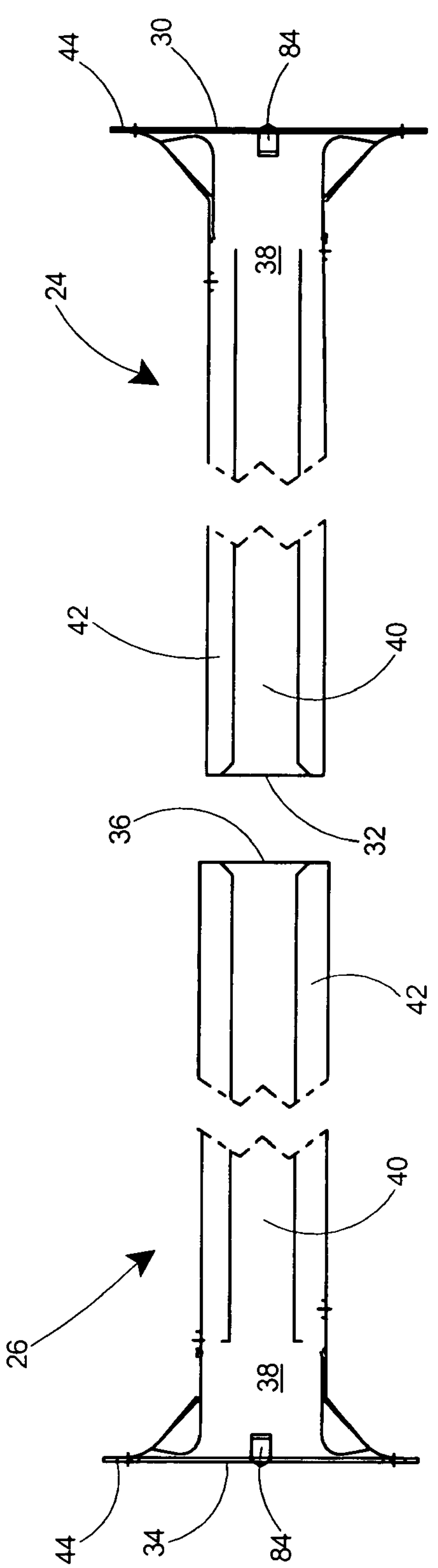
FIG. 2 is a bottom view of two tubular members that will be fitted together to form an adjustable mounting bar according to the present invention.

With reference to FIG. 2, the bottom sides 38 of each tubular member 24, 26 include longitudinal slots 40. Lips 42 surround the slots 40 and extend longitudinally along the bottom sides 38. Each of the tubular members 24, 26 include an end flange 44 on their outer ends 30, 34.

Figure 6:
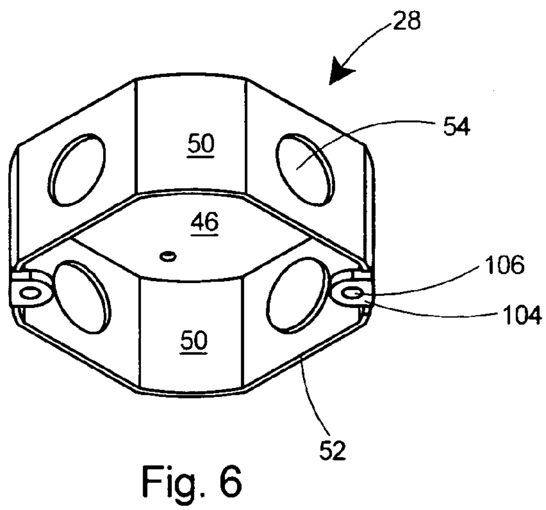
FIG. 6 is a perspective view of the electrical box portion of the electrical box mounting assembly of FIG. 1.
Figure 7:
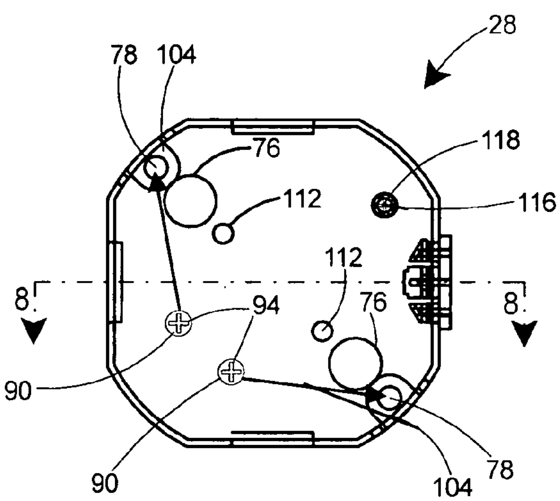
FIG. 7 is a bottom view of the electrical box shown in FIG. 6.
Figure 8:
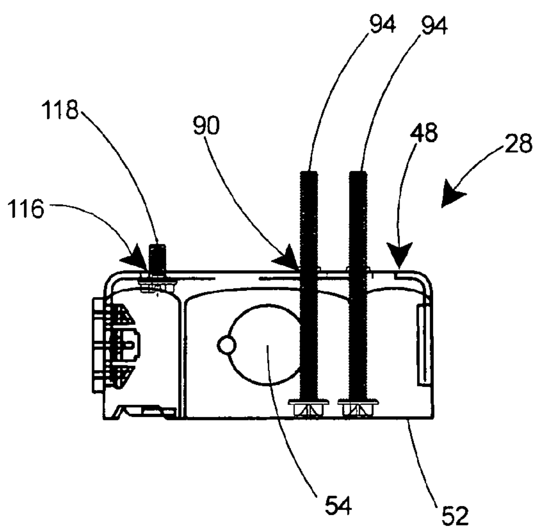
FIG. 8 is a sectional view of the electrical box taken along line 8—8 of FIG. 7.

Referring to FIGS. 6–8, the electrical box 28 used with the electrical box mounting assembly of the present invention includes a top wall 46 having a top surface 48 and side walls 50 having a bottom edge 52. The electrical box 28 may include knockout areas 54 which may be later removed as desired to allow for passage of wiring there through.

Figure 9:
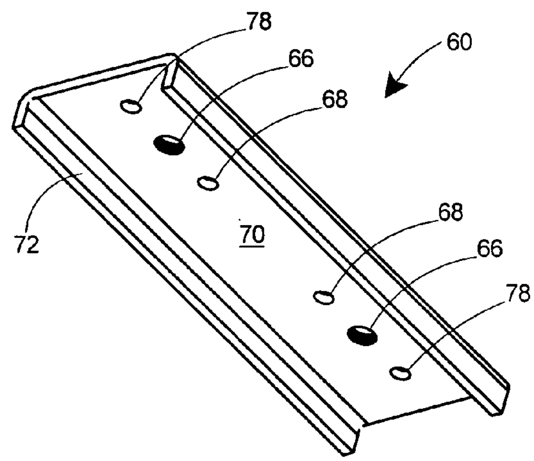
FIG. 9 is a perspective view of an outer clamping member that forms a portion of a clamping arrangement in the adjustable mounting bar and electrical box assembly of the present invention.
Figure 10:
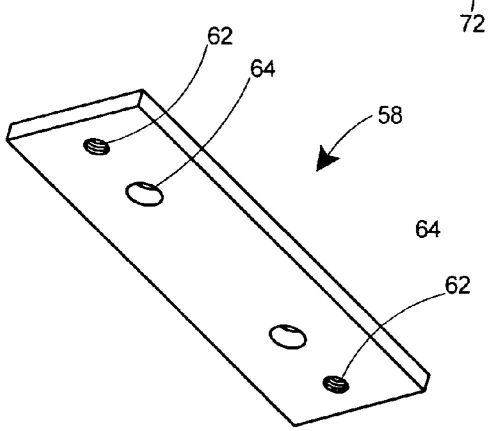
FIG. 10 is a perspective view of an inner bar that forms a portion of a clamping arrangement in the adjustable mounting bar and electrical box assembly of the present invention.

With reference to FIGS. 9–10, a clamp arrangement 56 is depicted. The clamp arrangement 56 includes an inner bar 58 and an outer clamping member 60. The inner bar 58 includes outer 62 and inner 64 apertures that align respectively with middle 66 apertures and inner threaded bores 68 in the outer clamping member 60. Outer clamping member 60 includes a planar portion 70 and upturned edges 72 at a 90 degree angle to the planar portion 70.

Figure 11:
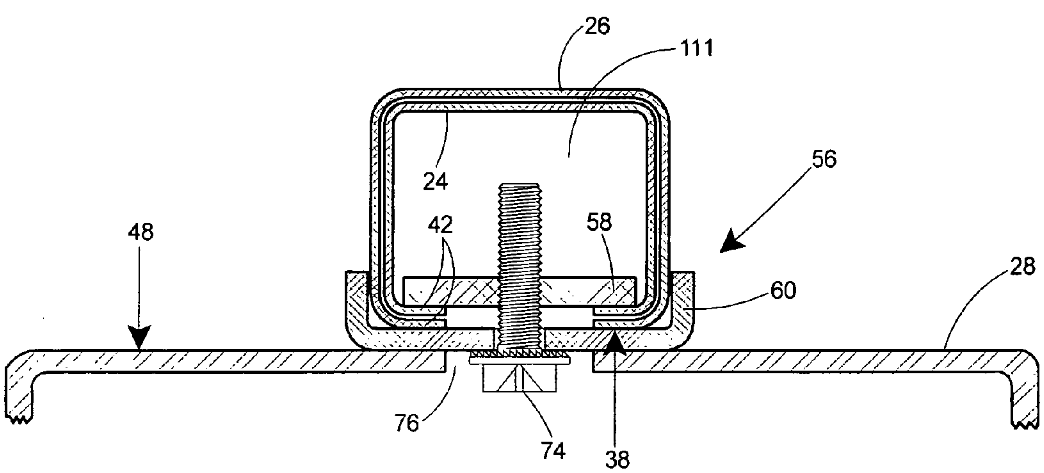
FIG. 11 is a cross-sectional view of the adjustable mounting bar taken along line 11—11 of FIG. 12 and depicting the clamping arrangement portion of the present invention.
Figure 12:
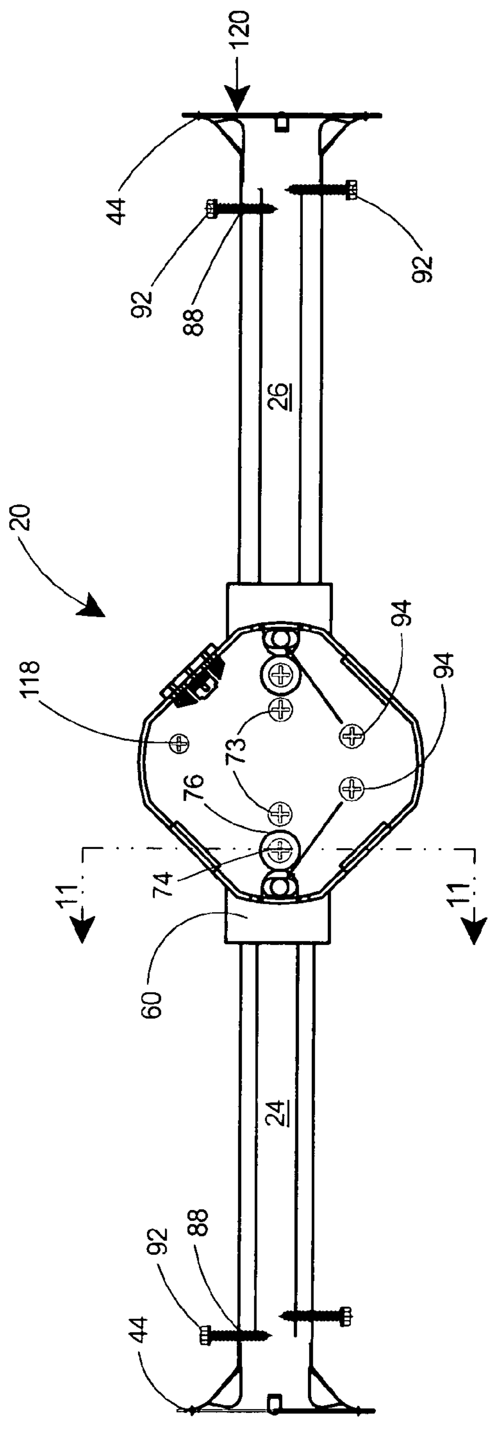
FIG. 12 is a bottom view of the adjustable mounting bar and electrical box assembly of FIG. 1.

Referring to FIGS. 11 and 12, the outer clamping member 60 is secured to the top surface 48 of the electrical box 28 by first fasteners 73 through aperture 112 in the top wall 46 of the electrical box 28 and secured into the inner threaded bores 68 in the outer clamping member 60. Outer clamping fasteners 74 connect the outer clamping member 60 to the inner bar 58 with the lips 42 of the bottom side 38 of the tubular members 24, 26 sandwiched there between. The inner bar 58 therefore is disposed within the inner tubular member 24 and rests on the lips 42 of the inner tubular member 24. With the outer clamping fasteners 74 loosely holding the outer clamping member 60 to the inner bar 58, the inner tubular member 24 can be easily slid within the outer tubular member 26 thereby adjusting the adjustable mounting bar 22 to the desired length. Since the outer clamping member 60 has already been secured tightly to the electrical box 28, once the adjustable mounting bar 22 has been adjusted to the desired length, the electrical box 28 can be adjusted to the desired position on the mounting bar 22 whereupon the outer clamping fasteners 74 can be tightened into the inner bar 58 to lock the adjustable mounting bar 22 to the desired length and also lock the electrical box 28 in the desired position. Two outer clamping fasteners 74 are typically used. The top wall 46 of the electrical box 28 includes oversized openings 76 sized larger than the head of the outer clamping fasteners 74, therefore allowing the electrical box 28, after initial mounting, to be removed from the adjustable mounting bar 22 without changing the length of the bar 22. The oversized openings 76 also insure that all of the weight of a suspended device is borne by the inner bar 58 and the tubular members 24, 26 and not by the electrical box 28, which, as a result of the oversized openings 76, escapes contact with the outer clamping fastener 74 and therefore does not support any of the suspended load. As shown in FIG. 9, the outer clamping member 60 further includes receptacles 78, the function of which will be explained herein.

Referring to FIG. 1, the end flanges 44 of the inner 24 and outer 26 tubular members include apertures 80, an inner face 82, and a V-shaped tab 84 bent from the inner face 82 such that the tab 84 can be later hammered outwards to temporarily secure the adjustable mounting bar 22 to the joists (not shown).

Figure 3:
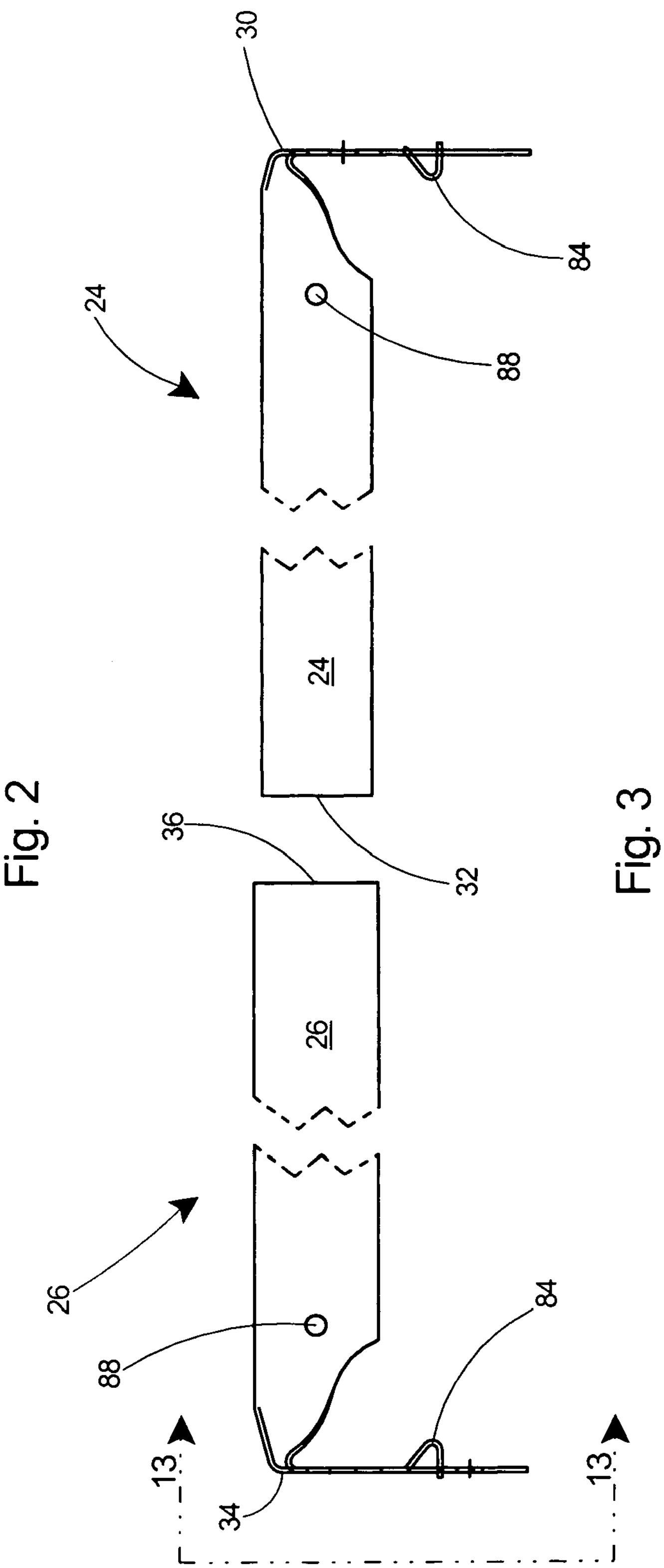
FIG. 3 is a side view of the two tubular members of FIG. 2.
Figure 4:
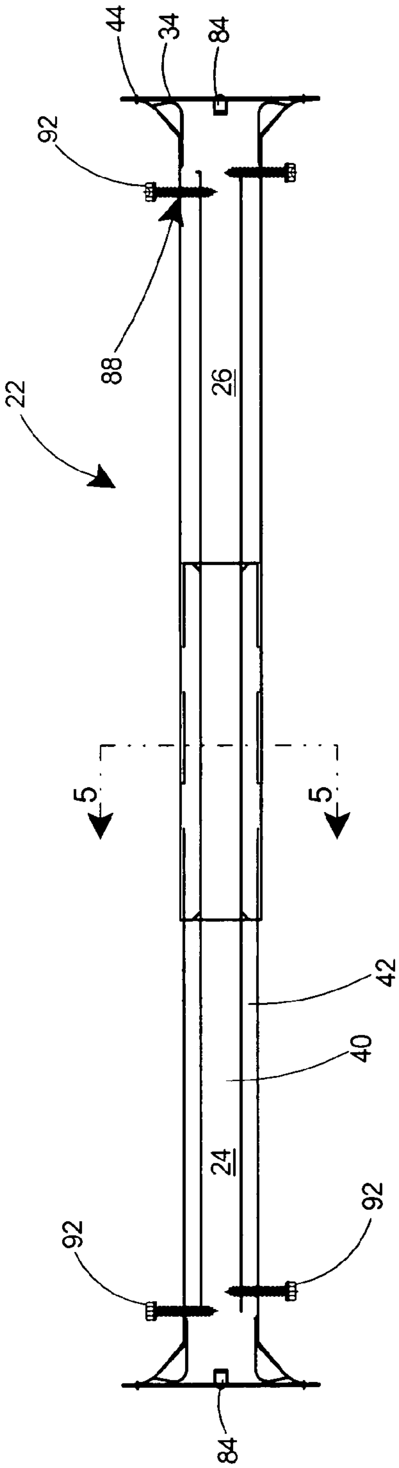
FIG. 4 is a bottom view of the two tubular members of FIG. 3 after they are fitted together to form the adjustable mounting bar of the present invention.

A distinguishing feature of the preferred embodiment of the electrical box mounting assembly 20 is the inclusion of prepackaged fasteners to simplify its installation. The prepackaged fasteners are held in temporary storage receptacles to make them readily available to the installer at the time of installation. As can be readily appreciated by anyone who has installed an overhead light fixture or fan, the fact that all the work is overhead and the installer is typically on a ladder, makes the installation challenging. One of the most difficult aspects of the installation is freeing ones hands to obtain the various fasteners, making sure to obtain the correct fastener, handling the fastener and screwdriver, and inserting the fastener while keeping the fan or light fixture in the proper position. To ease the installation task the electrical box mounting assembly 20 therefore includes a first temporary storage receptacle 88 near the outer ends 30, 34 of the tubular members 24, 26 as shown in FIG. 3 and two or more second temporary storage receptacles 90 in the top wall 46 of the electrical box 28 as shown in FIGS. 6–8. Prepackaged fasteners, as shown in FIG. 1, are stored in the temporary storage receptacles 88, 90 and include one or more bar fasteners 92 secured in the first temporary storage receptacles 88 and a device fastener 94 secured in the second temporary storage receptacle 90.

The electrical box mounting assembly 20 is typically supplied as shown in FIG. 1 but with the adjustable mounting bar 22 adjusted to its shortest length. As shown in FIG. 11, the outer clamping fasteners 74 are typically secured tightly to the inner bar 58 to lock the electrical box mounting assembly 20 to its shortest length. As supplied, the electrical box 28, referring to FIG. 1, is held tightly to the adjustable mounting bar 22, the bar fasteners 92 are held tightly in the first temporary storage receptacles 88, and the device fasteners 94 are held tightly in the second temporary storage receptacles 90. The device fasteners 94 are typically screws and the second temporary storage receptacles 90 are typically threaded bores. The device fasteners 94 are typically threaded into the second temporary storage receptacles 90 to a position in which the heads of the device fasteners 94 reside within the box and do not extend beyond a plane intersecting the bottom edge 52 of the electrical box 28. The bar fasteners 92 typically do not extend beyond the outer edge 98 of the end flanges 44. The electrical box mounting assembly 20 is therefore supplied in the smallest profile possible, with the bar fasteners 92 and device fasteners 94 not extending beyond the lateral extent of the electrical box 28 or the end flanges 44. For shipment, storage, and sale the electrical box mounting assembly 20 as supplied can be easily packaged within a rectangular packaging container without any fear of the prepackaged fasteners 92, 94 snagging or catching on the container or of loosening or dislodging from the first 88 and second 90 temporary storage receptacles. Alternatively, the electrical box 28 could be packaged and sold separately of the adjustable mounting bar 22, for example, to allow the consumer to choose an electrical box of a specific depth or shape, in which case the adjustable mounting bar 22 with the bar fasteners 92 temporarily stored therein would be packaged separately of the electrical box 28 with the device fasteners temporarily 94 stored therein. The explanation of the operation of the electrical box mounting assembly 20 that follows assumes the electrical box mounting assembly 20 is sold as a unit, with the electrical box 28 temporarily secured to the adjustable mounting bar 22.

To place the electrical box mounting assembly 20 in operation, a suitable location is found on a ceiling. Referring to FIG. 1, the outer clamping fasteners 74 are loosened, allowing the adjustable mounting bar 22 to be adjusted in length and further allowing the electrical box 28 to be slid along the length of the adjustable mounting bar 22 to the desired location.

Figure 14:
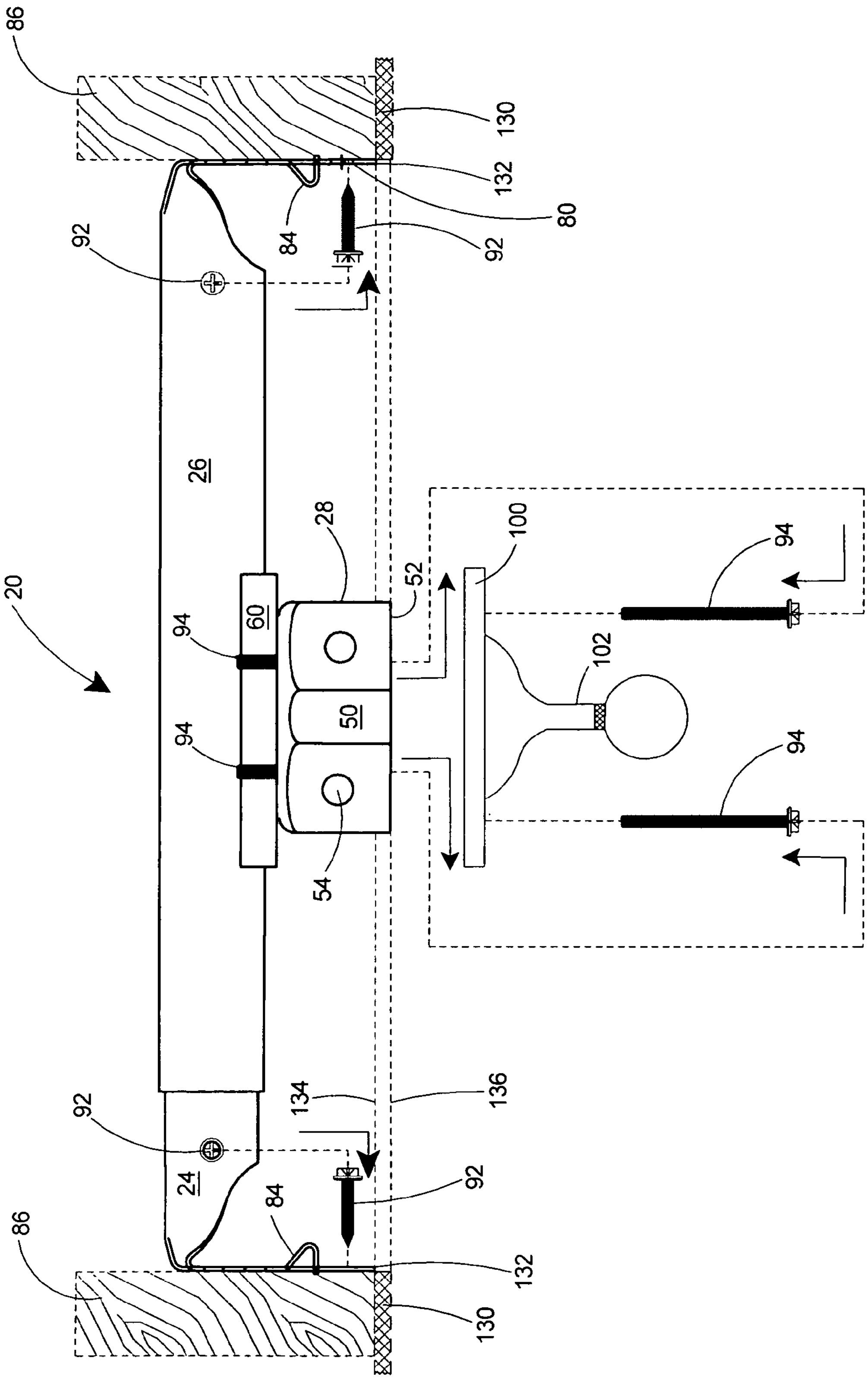
FIG. 14 is a side view of the adjustable mounting bar and electrical box assembly of FIG. 1, overhead joists, and a ceiling fixture in position to be attached thereto on a ceiling with a thin ceiling cover.

As shown in FIG. 14, the adjustable mounting bar 22 is adjusted to accommodate the distance between adjacent overhead joists 86 and the electrical box 28 is slid to the desired position on the mounting bar 22. The outer clamping fasteners 74 are then tightened to lock the electrical box 28 to the mounting bar 22 and to lock the adjustable mounting bar 22 to its desired length to span the joists 86. At this point in the installation procedure, the installer's hands are free and all of the required installation hardware is contained with the electrical box mounting assembly 20 in the form of the prepackaged fasteners 92, 94. The installer then lifts the electrical box mounting assembly 20 into the desired position between the joists 86 and hammers the V-shaped tabs 84 into the joists 86 to temporarily hold the mounting assembly 20 to the joists. The installers hands are then free to remove the bar fasteners 92 one at a time and secure them through the flange apertures 80 and into the joists 86. As shown in FIG. 1, a most preferred embodiment of the electrical box mounting assembly 20 includes four bar fasteners 92. The bar fasteners 92 are load bearing fasteners that are rated to hold an 80 pound ceiling light fixture or a 70 pound ceiling fan as specified by the National Electrical Code. After the bar fasteners 92 have been installed, the installer's hands are again free to proceed with the installation. The device fasteners 94, which are held tightly in the second temporary storage receptacles 90, may then be removed, the mounting ring 100 of an electrical device, such as a ceiling fan or light fixture 102, lifted in alignment with the bottom edge 52 of the electrical box 28, and the device fasteners 94 threaded into the receptacles 78 (see FIG. 7) to suspend the electrical device 102 from the electrical box mounting assembly 20. The receptacles 78 are typically threaded bores within the outer clamping member 60 to accept the device fasteners 94.

Referring to FIGS. 6 and 9, the bottom edge 52 of the electrical box 28 includes bent over portions 104 having alignment apertures 106 therein, the alignment apertures 106 situated to be in vertical alignment with the receptacles 78 in the outer clamping member 60.

With reference to FIG. 12, prior to tightening the device fasteners 94, wiring connections (not shown) can be completed between the housing electrical supply and the electrical device 102. Once wiring connections are completed, the device fasteners 94 are tightened to secure the electrical device 102 to the electrical box mounting assembly 20.

With reference to FIG. 5, it should be noted that the rectangular cross sections of the tubular members 24, 26 include side portions 108. The lips 42 of both the inner 24 and outer 26 tubular members include a top surface 110 that is smooth to allow the inner tubular member 24 to slide smoothly upon the outer tubular member 26 and to also allow the inner bar (not shown) to slide smoothly upon the lips 42 of the inner tubular member 24. As shown in FIG. 5, the top surface 110 of the lips 42, which face the inner channel 111 within the tubular members 24, 26, are at a non-oblique angle to the side portions 108.

Referring to FIG. 12, it is critical that several dimensions and materials of construction are maintained within specifications to support the weight of the electrical box mounting assembly 20 and the electrical device 102 suspended there from. The inner 24 and outer 26 tubular members, the electrical box 28, the outer clamping member 60, and the inner bar 58 are typically constructed from steel to resist torsional bending and strain from the suspended electrical device 102. The steel pieces are typically zinc-plated to render them rust resistant. The wall thickness of the tubular members 24, 26 is typically at least 0.038 inch. The inner bar 58 is at least 0.120 inch thick. The outer clamping member 60 is at least 0.050 inch thick.

With reference to FIGS. 1 and 14, the end flanges 44 are preferably at a 90 degree angle to the tubular members 24, 26 and the flanges 44 on each tubular member 24, 26 are of equal lengths. The bar fastener 92 will be load-bearing and is preferably a self-tapping machine screw no smaller than a #10 and no less than 1 inch in length. To accommodate the self-tapping machine screw bar fastener 92, the first temporary storage receptacle 88 is preferably a circular aperture with a diameter of 0.172 inch. The size of the device fastener 94 would vary in length depending on the size of the electrical box 28, but is preferably a 10-32 screw no less than 2.5 inches in length for an electrical box with a side wall of length 1.590 inch. The second temporary storage receptacles 90 are preferably threaded bores in the top wall 46 of the electrical box 28 threaded to match the threads on the device fastener 94.

Referring to FIGS. 6–8, the top surface 48 of the electrical box 28 typically is planar. The preferred embodiment of the top wall 46 includes the second temporary storage receptacles 90 which are threaded bores that will accept device fasteners 94, two apertures 112 that will accept first fasteners 73, oversized openings 76 to accommodate the outer clamping fasteners 74, apertures 114 to accommodate the device fasteners 94 when they are moved from the second temporary storage receptacles 90 to their receptacles, and a grounding aperture 116 which is a threaded bore to accept a grounding screw 118.

Figure 13:
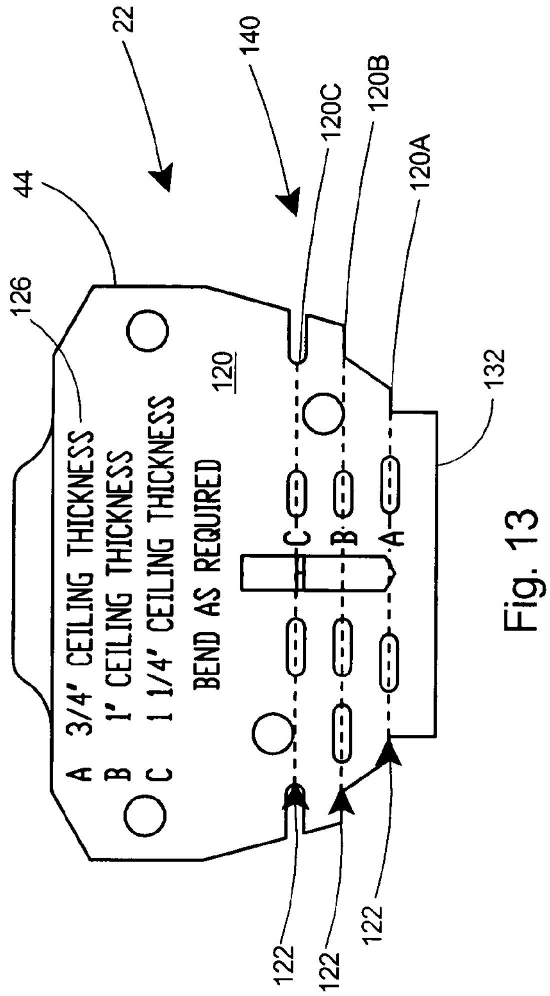
FIG. 13 is an end view of the adjustable mounting bar taken along line 13—13 of FIG. 3.

Referring to FIGS. 12 and 13, the end flanges 44 of the adjustable mounting bar 22 include an outer surface 120 that includes a plurality of rows of parallel apertures or slots 122. Each row of apertures 122 defines a separate bend line 124A, 124B, 124C. Indicia 126 are marked on the outer surface 120 of the end flanges 44 to indicate the thickness of ceiling covering material that are typically encountered in building construction. The indicia 126 correspond to a given thickness of ceiling covering material. Each row of parallel apertures 122 provides a bend line 124A, 124B, or 124C at which the end flange 44 can be bent outwardly to provide an outward facing seat 128 (see FIG. 15) for properly positioning the electrical box mounting assembly 20 for a given thickness of ceiling cover. For example, FIG. 14 depicts the installation of the electrical box mounting assembly 20 to two adjacent joists 86 that will be covered with ½" thick ceiling cover 130. For positioning the electrical box mounting assembly 20 on joists 86 that will receive a ½" thick ceiling covering 130, the end flanges 44 are kept intact and the bottom edge 132 of the end flange 44 (see FIG. 13) is aligned with the bottom of the joists 86. The bottom edge 52 of the sidewalls 50 of the electrical box 28 extend ½" below the line 134 connecting the bottom edge 132 of the end flanges 44. Therefore, positioning the bottom edge 132 of the end flanges 44 level with the bottom of the joists 86 positions the bottom edge 52 of the electrical box 28 level with the lower surface of the ½" thick ceiling cover 130, denoted by line 136 in FIG. 14.

Figure 15:
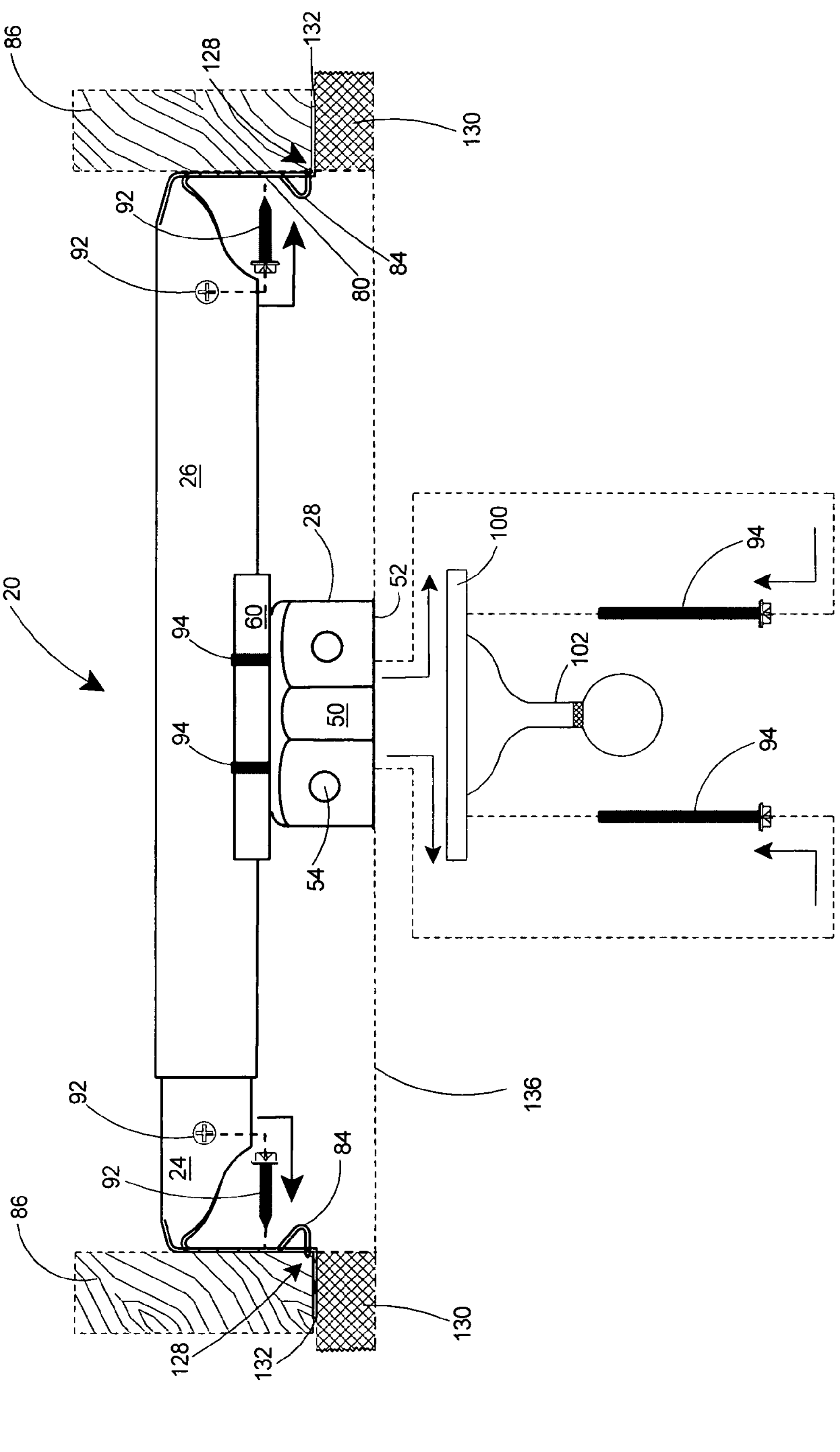
FIG. 15 is a side view of the adjustable mounting bar and electrical box assembly of FIG. 1, overhead joists, and a ceiling fixture in position to be attached thereto on a ceiling with a thick ceiling cover.

As an alternative example for a different thickness of ceiling cover, FIG. 15 depicts the installation of the electrical box mounting assembly 20 to two adjacent joists 86 that will be covered with ¾" thick ceiling cover 130. For positioning the electrical box mounting assembly 20 on joists 86 that will receive a ¾" thick ceiling covering 130, the end flanges 44 are bent outwards at the "A" bend line 124A. The resulting outward facing seat 128 on each of the end flanges 44 is placed flush against the bottom of each of the joists 86. Positioning the outward facing seat 128 of the end flanges 44 flush against the bottom of the joists 86 positions the bottom edge 52 of the electrical box 28 level with the lower surface of the ¾" thick ceiling cover 130, denoted by line 136 in FIG. 15. In a similar manner, bending the end flanges 44 outwardly at the "B" bend line 124B will position the bottom edge 52 of the electrical box 28 level with a 1" thick ceiling and bending the end flanges 44 outwardly at the "C" bend line 124C will position the bottom edge 52 of the electrical box 28 level with a 1" thick ceiling. The bend lines 124A, 124B, 124C therefore provide a positioning arrangement 140 (see FIG. 13) that allows easy positioning of the electrical box mounting assembly 20 for a given thickness of ceiling cover 130.

Having thus described the invention with reference to a preferred embodiment, it is to be understood that the invention is not so limited by the description herein but is defined as follows by the appended claims.

What is claimed is:

1. An electrical box mounting assembly for securing an electrical device to a ceiling comprising:

A) An adjustable mounting bar including:
  i) an inner tubular member having a first rectangular cross section, two ends, side portions, a bottom side, and a longitudinal slot extending along said bottom side;
  ii) an outer tubular member having a second rectangular cross section, two ends, side portions, a bottom side, and a longitudinal slot extending along said bottom side;
  iii) said first rectangular cross section of said inner tubular member smaller than said second rectangular cross section of said outer tubular member thus enabling said inner tubular member to be received in and slide with respect to said outer tubular member;
  iv) lips surrounding said slots and extending longitudinally along said bottom sides, said lips having a top surface; and
  v) said tubular members including an end flange on a first of said ends, said end flange including an outer surface;

B) an electrical box including a bottom edge and a top wall having a top surface;

C) a clamp arrangement for securing said electrical box to said adjustable mounting bar, said clamp arrangement including:
  i) an inner bar disposed within said inner tubular member and resting on said lips;
  ii) an outer clamping member secured to said top surface of said electrical box;
  iii) outer clamping fasteners connecting said outer clamping member to said inner bar, said outer clamping fasteners adapted to secure said electrical box to said adjustable mounting bar and lock said adjustable mounting bar to a fixed length; and
  iv) receptacles in said outer clamping member;

B) temporary fastener storage receptacles including:
  i) a first temporary storage receptacle on said first end of said tubular members; and
  ii) two or more second temporary storage receptacles in said top wall of said electrical box;

B) prepackaged fasteners including:
  i) a bar fastener secured in said first temporary storage receptacle; and
  ii) a device fastener secured in said second temporary storage receptacle;

F) a positioning arrangement on said outer surface of said end flange of said tubular members, said positioning arrangement including:
  i) one or more rows of apertures arranged horizontally on said end flanges; and
  ii) each of said rows of apertures defining a bend line thereon;

whereby said flanges are bendable at any of said rows of apertures to provide an outward facing seat for positioning said bottom edge of said electrical box flush with said ceiling.

2. The electrical box mounting assembly of claim 1 wherein said inner bar is constructed of steel.

3. The electrical box mounting assembly of claim 2 wherein said inner bar is at least 0.120 inch thick.

4. The electrical box mounting assembly of claim 1 wherein said electrical box includes bent over portions extending from said bottom edge of said electrical box, said bent over portions having alignment apertures therein, said alignment apertures being in vertical alignment with said receptacles in said outer clamping member.

5. The electrical box mounting assembly of claim 4 wherein said receptacles in said outer clamping member are threaded bores.

6. An electrical box mounting assembly for securing an electrical device to overhead joists comprising:

A) An adjustable mounting bar including:
  i) an inner tubular member having a first rectangular cross section, two ends, side portions, a bottom side, and a longitudinal slot extending along said bottom side;
  ii) an outer tubular member having a second rectangular cross section, two ends, side portions, a bottom side, and a longitudinal slot extending along said bottom side;
  iii) said first rectangular cross section of said inner tubular member smaller than said second rectangular cross section of said outer tubular member thus enabling said inner tubular member to be received in and slide with respect to said outer tubular member;
  iv) lips surrounding said slots and extending longitudinally along said bottom sides, said lips having a top surface; and
  v) said tubular members including an end flange on a first of said ends, said end flange including an outer surface;

B) an electrical box including a bottom edge and a top wall having a top surface;

C) a clamp arrangement for securing said electrical box to said adjustable mounting bar, said clamp arrangement including receptacles therein;

D) a positioning arrangement including on said outer surface of said end flange of said tubular members, said positioning arrangement including:
  i) one or more rows of apertures arranged horizontally on said end flanges;
  ii) each of said rows of apertures defining a bend line thereon;

E) temporary fastener storage receptacles including:
  i) a first temporary storage receptacle on said first end of said tubular member;
  ii) two or more second temporary storage receptacles in said top wall of said electrical box; and F) prepackaged fasteners including:
  i) a bar fastener threadably engaged in said first temporary storage receptacle; and
  ii) a device fastener threadably engaged in said second temporary storage receptacle;

whereby said bar fasteners are removed from said first temporary storage receptacles and fastened through said end flanges to secure said adjustable mounting bar to said joists and said device fastener is removed from said second temporary storage receptacle and fastened into said receptacle in said clamp arrangement to secure said electrical device to said electrical box.

* * * * *